(No Model.)
J. L. DE GOOD.
TROMBONE GAGE.
No. 526,616. Patented Sept. 25, 1894.
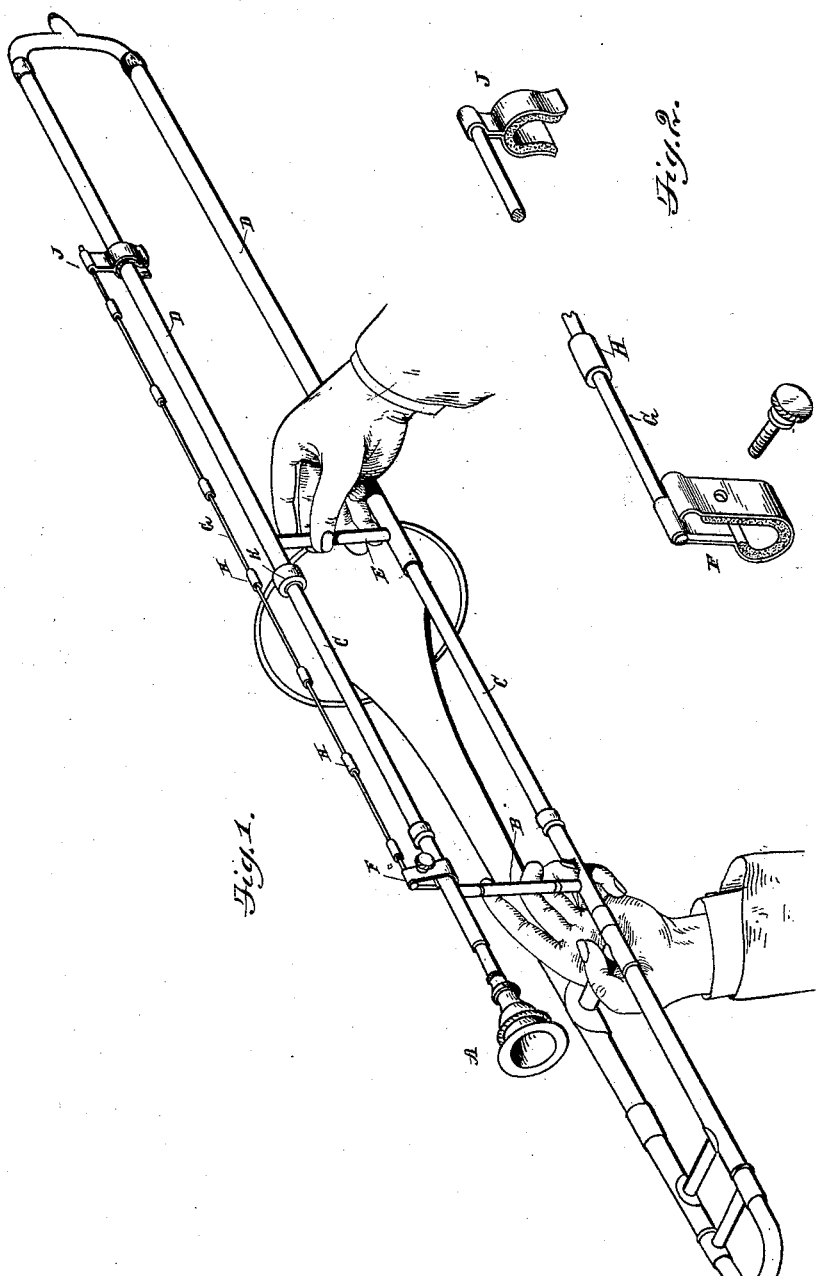
WITNESSES
D. W. Bradford
F. Clough
INVENTOR
Joseph L. De Good
By Parker & Burton
Attorneys.

UNITED STATES PATENT OFFICE.

JOSEPH L. DE GOOD, OF DETROIT, MICHIGAN.

TROMBONE-GAGE.

SPECIFICATION forming part of Letters Patent No. 526,616, dated September 25, 1894.

Application filed April 13, 1894. Serial No. 507,374. (No model.)

*To all whom it may concern:*

Be it known that I, JOSEPH L. DE GOOD, a citizen of the United States, residing at Detroit, county of Wayne, State of Michigan, have invented a certain new and useful Improvement in Trombone-Gages; and I declare the following to be a full, clear, and exact description of the invention, such as will enable others skilled in the art to which it pertains to make and use the same, reference being had to the accompanying drawings, which form a part of this specification.

My invention relates to trombones, and it consists in the combination therewith of a position finder in the manner hereinafter described and claimed.

It is well-known that the tones in a trombone are graduated by the movement of a sliding tube, combined with the lips at the mouth-piece, and that certain positions of the tube give tones within certain ranges, and that great difficulty is experienced by those who are students of the instrument, especially in regulating the position by the quick movement of the sliding tube so as to produce the required tones with precision. In order to overcome this, I have devised what I have termed a "position indicator," which is attached to the fixed and sliding tubes having indices thereon by which the end of the sliding tube can be readily adjusted.

In the drawings, Figure 1 is a perspective view of the trombone. Fig. 2 is a perspective view of the indicator.

Similar letters refer to similar parts.

A is the mouth-piece.

B is the brace.

C, C are the fixed tubes.

D is the sliding tube bent in the form of a U, and telescoping upon fixed tubes C C.

E is a brace connecting the two legs of the sliding tube.

Upon the fixed tube, leading to the mouth-piece A, I attach a clip F, which carries a rod G, upon which are preferably threaded sections of a small rubber tube H H. These are movable along the rod G, and can be adjusted at different distances, grasping it, however, firmly enough to remain with some degree of tenacity in any position in which they may be placed.

J is a friction clip firmly attached to the outer end of the rod G, and engaging one of the legs of the sliding tube D, the sliding tube passing through the jaws of the clip J freely. It, however, affords a support to the outer end of the rod G.

Upon the leg of the sliding tube D, adjacent to the rod G, I place an enlargement or ferrule, K, preferably of rubber. The object of this is simply to make the end of the tube conspicuous enough so that it is readily observed by the eye of the player. By contrasting this ferrule K with the indicators H H, the position of the sliding tube D D can almost instantaneously be attained, so that the firsts, seconds, and thirds, &c., are at once obtained without special skill in adjustments.

If desired, the clips F J may be turned at right angles to the plane of the tubes C C, so that the indicators H H may be contiguous to the forefinger of the right hand operating the movable sliding tube, and, by slightly coming in contact with it, the positions can also be readily attained by means of touch as well as sight.

The mode of operation of this device is readily apparent from this description.

What I claim is—

In a trombone, the combination, with the fixed tube and the movable tube, of a position indicator attached to the fixed tube and engaging by sliding contact the movable tube, and having thereon indices to indicate the distance to which the movable tube may be shifted, substantially as described.

In testimony whereof I sign this specification in the presence of the presence of two witnesses.

JOSEPH L. DE GOOD.

Witnesses:
 FRANCIS CLOUGH,
 D. W. BRADFORD.